INVENTOR.
CLAIR L. FARRAND.

BY W. E. Beatty

ATTORNEY.

INVENTOR.
CLAIR L. FARRAND.

BY W E Beatty

ATTORNEY.

United States Patent Office 3,340,451
Patented Sept. 5, 1967

3,340,451

FLUX RESPONSIVE READING SYSTEM FOR A MAGNETICALLY RECORDED DIGITAL PROGRAMMED POSITION SERVO

Clair L. Farrand, Bronxville, N.Y., assignor to Inductosyn Corporation, Carson City, Nev., a corporation of Nevada Filed Mar. 26, 1963, Ser. No. 267,971
6 Claims. (Cl. 318—162)

This invention relates to equipment for numerically controlling the relative position of two or more members. The members may move linearly or rotationally. This invention is described in respect to its application to the control of a single linear axis of a machine.

It will be apparent that it is applicable to a plurality of linear or rotary axes of any mechanical system employing a plurality of relatively movable members.

More specifically, the invention relates to the control of relatively movable members by means of digital information stored on a magnetic tape record in digital form. The invention will be better understood by reference to the following drawings, wherein.

Figure 1:
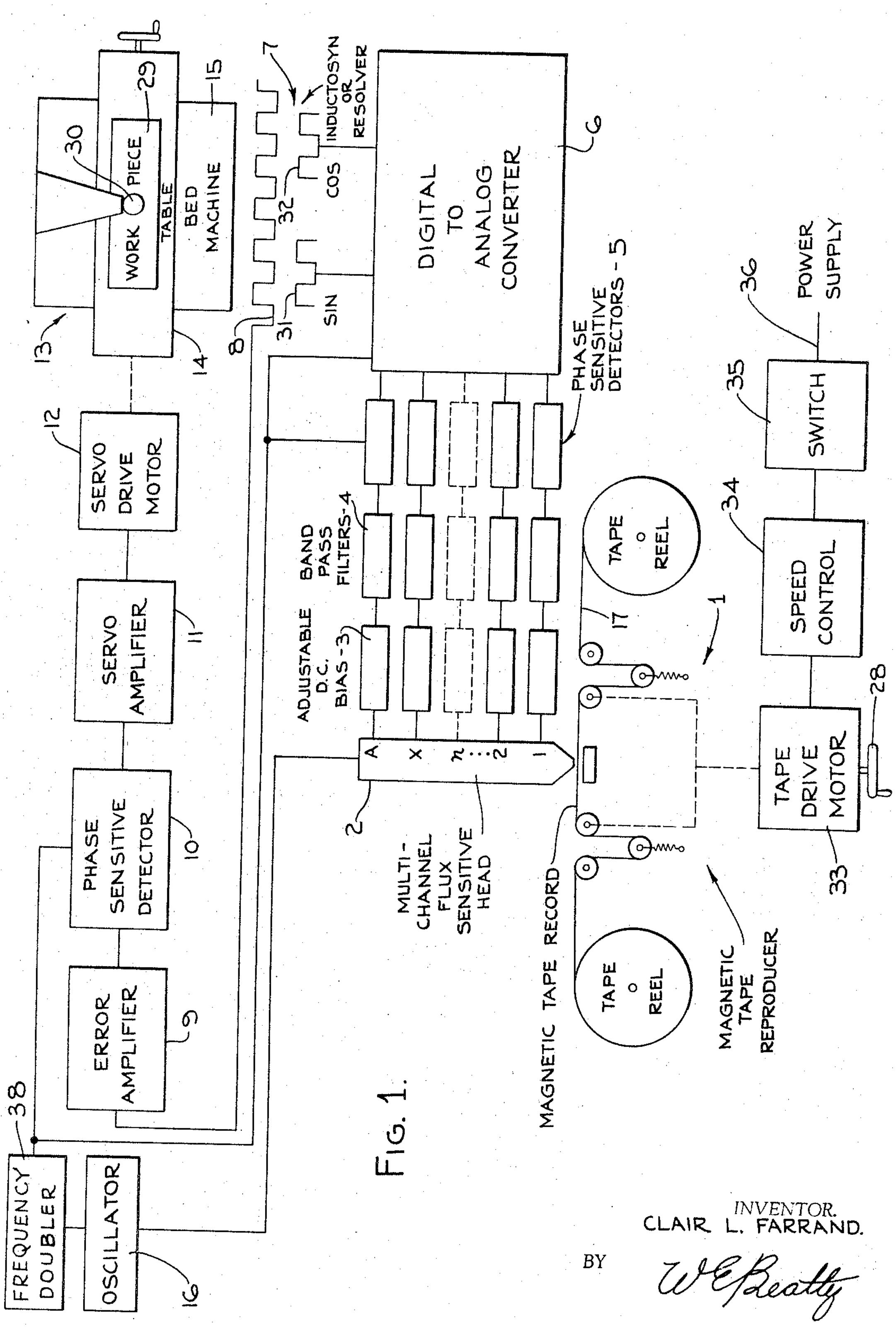
FIG. 1 is a schematic diagram of the invention applied to machine control.

Referring to FIG. 1, 1 is a magnetic tape reproducer of conventional type capable of operating in either direction. 2 is a multiple channel reading head of the flux sensitive type, which produces a signal from flux density rather than from the rate of change of flux density as is most commonly used. In other words, a signal is produced even through the magnetic tape is stationary. The head 2 has a number of channels corresponding to the digital information stored on the magnetic tape. Each channel has a flux sensitive reading head and each head has an adjustable D.C. bias 3, a band pass filter 4, and a phase sensitive detector 5, the output of which operates a switch in the digital-analog converter indicated as 6. The digital-analog converter 6 may be of the type shown in the following U.S. patents employing switches and transformers to produce its output of sine and cosine voltages to be applied to the windings of an Inductosyn (registered trademark) or resolver indicated as 7; 2,839,711, June 17, 1958, and 2,875,390, Feb. 24, 1959. The windings have a geometric spacing corersponding to the trigonometrical relation of the inputs. The single output winding 8 of the Inductosyn or resolver 7 is connected to an error amplifier 9, which is connected to a phase sensitive detector 10, which is connected in turn to a servo amplifier 11 which supplies a servo drive motor 12 mechanically coupled to the machine 13 to produce relative motion of the members of the machine. The machine 13 is shown schematically as a table 14 carried on the ways of a machine bed 15 in conventional manner. An oscillator 16 supplies electrical current which may be several kilocycles frequency although any suitable frequency may be used. This is supplied to the flux head 2 and to a frequency doubler 38 which supplies an A.C. bias acting as a reference signal to the digital-to-analog converter 6, to the phase sensitive detector 5 of the head 2 and to the phase sensitive detector 10 of the servo drive.

Figure 2:
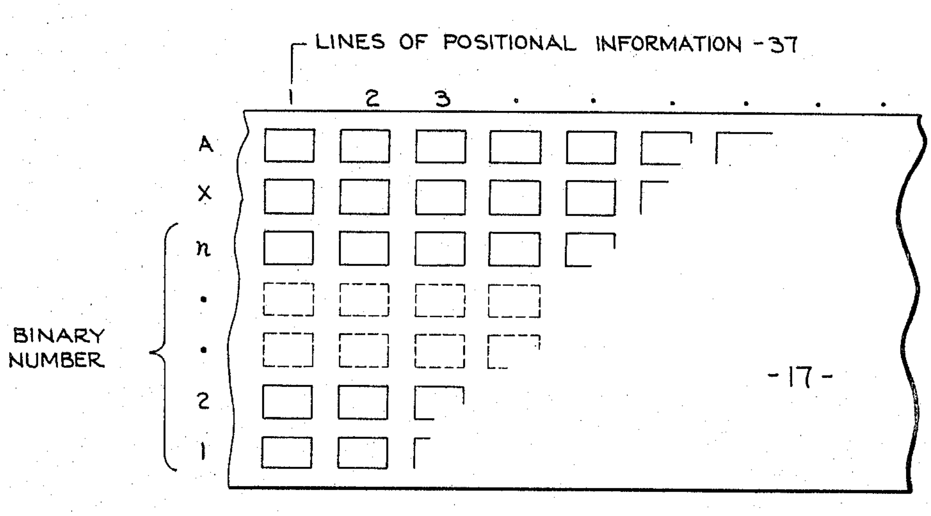
FIG. 2 is a schematic plan view of a magnetic tape record.

FIG. 2 shows in schematic form the digital information stored on the magnetic tape 17 which is to be read by the flux sensitive head 2. The information may be stored in conventional digital form of north or south magnetic polarity. A tape is shown although any convenient form of magnetic record such as a drum, or other device, may be employed. It is convenient to use 16 channels on magnetic tape of one inch width. A number of channels indicated as N are employed for the binary number. These may be conveniently 10 in number and the balance of the channels are used for addresses and other necessary information for operation of the machine, such as speed, tool indication, etc. The number of lines of positional information may be 100 or 200 lines per inch, and the magnetic tape may move at speeds of one or several inches per second.

Figure 3:
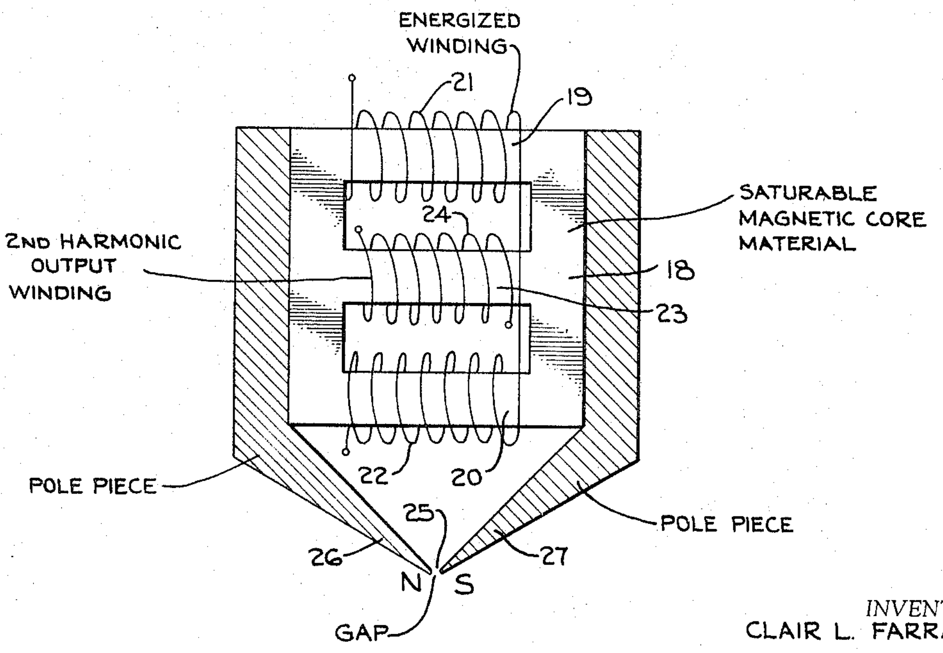
FIG. 3 is a sectional view of a magnetic tape reading head for use in the circuit of FIG. 1.

FIG. 3 is a cross sectional view of one form of a flux sensitive head 2 where a core 18 of saturable magnetic material has three legs. On the outer two legs 19, 20 of this core are windings 21, 22 energized from the oscillator 16 and on the central leg 23 of the core is a winding 24 which produces a second harmonic of the energizing frequency when the saturation of the magnetic core is changed by the application of the flux at the gap 25 between the pole pieces 26, 27. This structure is of the type shown in an article in "Electronics" of Mar. 6, 1959, pages 58 to 60, inclusive.

Heretofore, the relatively movable members have been controlled by digital information on magnetic tape by means of reading heads whose output is dependent upon the rate of change of magnetic flux resulting from the motion of the magnetic tape. In such case, the tape moves at a speed of several inches per second producing A.C. voltages of several hundred c.p.s. which operate the switches of the digital-to-analog converter. Only as long as the tape is up to speed will the servo drive the members to positions corresponding to the command of each line of digital information on the magnetic tape. When it was desired to stop the machine for some reason, which might be, for example, a defect in the performance of the cutter operating on the work piece, or for other reason, synchronism between the members and the positional command of the tape was temporarily lost because as the tape slowed down, both the frequency and amplitude of the output voltage of the head were reduced to a point where the switches of the digital-to-analog converter ceased to function, and the servo ceased to drive. For the period as the speed of the tape reduced to zero from this point until it again reached a point where the speed was again sufficient to cause the system to operate, the members were not driven to positions corresponding to the commands. Thus there was a loss of correspondence between the positional information of the tape and the relative position of the members.

By this invention, this difficulty is avoided by using the flux sensitive head 2 which gives an output signal at any tape speed from the operating speeds down to zero where the tape 17 is stationary. When the tape 17 is stationary it may be moved by the manual control 28 to the next line of positional information and the position of the members will be changed correspondingly.

Referring to FIG. 1, the machine is operated in a conventional manner by a servo motor 12. When the position of the machine member such as table 14 and its workpiece 29 with respect to tool 30 does not correspond to the positional command of the tape 17 and the digital-analog converter 6, the data element 7 of the machine, that is the Inductosyn or resolver, supplies an error signal, which drives the table 14 to the corresponding position at which a null signal is produced.

The digital-analog converter 6 is conventionally made in binary form, employing transformers and switches to an electrical angle of a position measuring transformer which set up sine and cosine ratio voltages corresponding such as Inductosyn or resolver 7, and as described in the aforementioned U.S. patent.

The output of the flux sensitive head 2 is a second harmonic of the frequency of the input to the energized windings 21, 22. By adjusting the D.C. bias 3 of the saturable magnetic core material 18, the amplitude of the second harmonic is made a maximum. The band pass filters 4 reject the energizing and other frequencies, and pass the second harmonic voltage to the phase sensitive detectors 5 which also have reference input from the frequency doubler 38. The detectors 5 produce a D.C. output corresponding to the phase of the second harmonic frequency from the head 2 which in turn corresponds to the polarity of the magnetic record on the tape 17. This direct current is supplied to the switches of the digital-analog converter 6 which set up in binary form the sine and cosine voltage ratios which are applied to the windings 31, 32 of this position measuring transformer as analog position commands for the reltive position of the machine members 14, 30.

The magnetic tape reproducer 1 is shown driven by a motor 33 and alternatively by a hand crank 28. A motor speed and reversing control 34 is provided and a switch 35 is provided to disconnect the motor 33 from the supply line 36. In operation, the tape 17 may be stopped by the switch 35. When the tape 17 stands still, the flux sensitive head 2 provides a signal, which in turn energizes the relays of digital-to-analog converter 6, setting up sine and cosine voltage ratios which actuate the servo motor 12 and drive the table 14 or other member of the machine to the corresponding position, and hold it in this position. If it is desired to change the relative position of the members 14 and 30 slowly or in small increments, the tape 17 may be advanced by hand by operating the manual control 28 and the head 2 will supply a signal for each line of positional information as indicated at 37 in FIG. 2 and the machine members will be servo driven to each corresponding position.

I claim:

1. A program controlled positioning system for the movable element of a machine tool having fixed and movable members, said system comprising (1) a stationary magnetic flux density sensitive reading head for a magnetic record having a digital signal representing the relative position of said stationary member and said movable member, said movable member being fixed to said movale machine element, (2) said head supplying an output of said digital positional signals, responsive to flux density, to (3) a phase sensitive detector having a reference input, (4) a digital-to-analog converter having an input from said phase sensitive detector and supplying as an output analog signals of the same phase as said digital signal, said analog signals having a trigonometric relation representative of said digital, and analog signals being supplied to (5) a position measuring transformer having input windings having a geometrical spacing corresponding to said trigonometric relation, (6) whereby said digital-to-analog converter supplies position signals to said input windings at all operative speeds of the magnetic record including zero speed when said head and said record are stationary, said position signals corresponding to and being of the same phase as the digital signal of said record.

2. A program controlled positioning system according to claim 1, (1) said position measuring transformer having an output winding, (2) a servo control for driving said movable member, (3) said servo control having an input from said output winding.

3. A program controlled positioning system according to claim 1, (1) said position measuring transformer having an output winding, (2) a servo control for driving said movable member, said servo control having (3) a phase detector having (4) an input from said output winding.

4. A program controlled positioning system according to claim 1, (1) said position measuring transformer having an output winding, (2) a servo control for driving said movable member, (3) said servo control having an input from said output winding, and (4) an oscillator supplying (a) said reference of frequency $2f$ to said phase detector, and (b) an input frequency $f$ to energize said magnetic head to produce said output of said head of frequency $2f$.

5. A program controlled positioning system having fixed and movable members, said system comprising (1) a magnetic flux density sensitive reading head for (2) a magnetic record having a digital signal representing the relative position of said fixed and movable members, (3) said head supplying an output of said digital positional signal of frequency $2f$, responsive to flux density, to (4) a phase sensitive detector, (5) a digital-to-analog converter having an input from said phase sensitive detector and supplying as an output analog signals having a trigonometric relation representative of said digital signal to (6) a position measuring transformer having input windings having a geometrical spacing corresponding to said trigonometric relation, (7) a source of frequency $f$ for energizing said reading head for producing said output of frequency of $2f$ from said head, and a reference source of frequency $2f$ for energizing said phase sensitive detector, whereby the output of the detector has the same phase as the phase of the digital signal of said record.

6. A program controlled positioning system according to claim 5, whereby said digital-to-analog converter supplies analog positional signals to said position measuring transformer corresponding to said recorded digital positional signal at all operative speeds of said magnetic record including zero speed when said head and said record are stationary.

References Cited

UNITED STATES PATENTS

| | | |
|---|---|---|
| 2,625,607 | 1/1953 | Eckert et al. |
| 2,704,789 | 3/1955 | Kornei. |
| 2,755,422 | 7/1956 | Livingston. |
| 2,822,531 | 2/1958 | Carroll. |
| 2,855,464 | 10/1958 | Wiegand. |
| 2,892,041 | 6/1959 | Rubens et al. |
| 3,127,592 | 3/1964 | De Neergaard. |

ORIS L. RADER, *Primary Examiner.*

T. LYNCH, *Assistant Examiner.*

UNITED STATES PATENT OFFICE

CERTIFICATE OF CORRECTION

Patent No. 3,340,451 September 5, 1967

Calir L. Farrand

It is hereby certified that error appears in the above numbered patent requiring correction and that the said Letters Patent should read as corrected below.

Column 2, line 68, strike out "which set up sine and cosine ratio voltages corresponding" and insert the same after "switches" in line 66, same column 2; column 3, line 16, for "reltive" read -- relative --; line 44, for "movale" read -- movable --.

Signed and sealed this 29th day of October 1968.

(SEAL)
Attest:

Edward M. Fletcher, Jr.
Attesting Officer

EDWARD J. BRENNER
Commissioner of Patents

UNITED STATES PATENT OFFICE

CERTIFICATE OF CORRECTION

Patent No. 3,340,451 September 5, 1967

Clair L. Farrand

It is certified that error appears in the above identified patent and that said Letters Patent are hereby corrected as shown below:

Column 1, line 35, "through" should read -- though --; line 49, "corersponding" should read -- corresponding --. Column 3, line 53, "digital," should read -- digital --; same line 53, "and" should read -- signal, said --. Column 4, line 20, after "reference" insert -- input --; line 22, after "input" insert -- of --; line 46, "the", second occurrence, should read -- said --.

Signed and sealed this 21st day of April 1970.

(SEAL)
Attest:

Edward M. Fletcher, Jr.
Attesting Officer

WILLIAM E. SCHUYLER, JR.
Commissioner of Patents